United States Patent
Yu et al.

(10) Patent No.: US 12,483,747 B2
(45) Date of Patent: Nov. 25, 2025

(54) MINIMIZING INITIALIZATION DELAY IN LIVE STREAMING

(71) Applicants: Beijing Bytedance Network Technology Co., Ltd., Beijing (CN); Bytedance Inc., Los Angeles, CA (US)

(72) Inventors: Yongyi Yu, Beijing (CN); Le Yang, Beijing (CN); Jianping Chen, Beijing (CN); Ye-Kui Wang, San Diego, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 25 days.

(21) Appl. No.: 18/487,342

(22) Filed: Oct. 16, 2023

(65) Prior Publication Data

US 2024/0048798 A1 Feb. 8, 2024

Related U.S. Application Data

(63) Continuation of application No. PCT/CN2022/086782, filed on Apr. 14, 2022.

(30) Foreign Application Priority Data

Apr. 16, 2021 (WO) ................ PCT/CN2021/087646

(51) Int. Cl.
*H04N 21/435* (2011.01)
*H04N 21/2187* (2011.01)
(Continued)

(52) U.S. Cl.
CPC ....... *H04N 21/435* (2013.01); *H04N 21/2187* (2013.01); *H04N 21/438* (2013.01);
(Continued)

(58) Field of Classification Search
CPC ............. H04N 21/435; H04N 21/2187; H04N 21/438; H04N 21/4402; H04N 21/8456;
(Continued)

(56) References Cited

U.S. PATENT DOCUMENTS

| | | |
|---|---|---|
| 2013/0293677 A1 | 11/2013 | Lee et al. |
| 2014/0019587 A1 | 1/2014 | Giladi |

(Continued)

FOREIGN PATENT DOCUMENTS

| | | |
|---|---|---|
| CN | 103222276 A | 7/2013 |
| CN | 104270646 A | 1/2015 |

(Continued)

OTHER PUBLICATIONS

"Series H: Audiovisual and Multimedia Systems Infrastructure of audiovisual services—Coding of moving video High efficiency video coding," ITU-T and ISO/IEC, Rec. ITU-T H.265 | ISO/IEC 23008-2 (in force edition), Feb. 2018, 692 pages.

(Continued)

*Primary Examiner* — Anthony Bantamoi
(74) *Attorney, Agent, or Firm* — Conley Rose, P.C.

(57) ABSTRACT

A method for processing media data includes identifying in a media presentation description (MPD) an indication of a Tuning-In Media Segment. The Tuning-In Media Segment comprises a latest media data for a client device to start with when tuning into an ongoing live streaming service. The latest media data is selected from either a current media segment that is being generated by the ongoing live streaming service or a previous media segment generated by the ongoing live streaming service based on a length of the current media segment. The MPD is stored by the client device prior to the client device tuning into the ongoing live (Continued)

streaming service. The method further includes performing a conversion between a visual media data and a bitstream according to the MPD.

17 Claims, 9 Drawing Sheets

(51) Int. Cl.
    *H04N 21/438*     (2011.01)
    *H04N 21/4402*     (2011.01)
    *H04N 21/845*     (2011.01)
    *H04N 21/858*     (2011.01)

(52) U.S. Cl.
    CPC ..... *H04N 21/4402* (2013.01); *H04N 21/8456* (2013.01); *H04N 21/8586* (2013.01)

(58) Field of Classification Search
    CPC ......... H04N 21/8586; H04N 21/26258; H04N 21/4383; H04N 21/6373; H04N 21/8455
    See application file for complete search history.

(56) References Cited

U.S. PATENT DOCUMENTS

| | | | |
|---|---|---|---|
| 2020/0404361 | A1 | 12/2020 | Lohmar |
| 2021/0105542 | A1* | 4/2021 | Stockhammer .... H04N 21/8456 |

FOREIGN PATENT DOCUMENTS

| | | | |
|---|---|---|---|
| CN | 104780205 | A | 7/2015 |
| CN | 105871723 | A | 8/2016 |
| CN | 107637040 | A | 1/2018 |
| CN | 107920108 | A | 4/2018 |
| CN | 113794898 | A | 12/2021 |
| CN | 114630157 | A | 6/2022 |
| CN | 114786034 | A | 7/2022 |
| GB | 2543279 | A | 4/2017 |
| JP | 2018186551 | A | 11/2018 |
| WO | 2023104064 | A1 | 6/2023 |

OTHER PUBLICATIONS

Document: JVET-G1001-v1, Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.

"Series H: Audiovisual and Multimedia Systems Infrastructure of audiovisual services—Coding of moving video Versatile video coding," Recommendation ITU-T H.266, Aug. 2020, 516 pages.
Document: JVET-S2001-vH, Bross, B., et al., "Versatile Video Coding (Draft 10)," Joint Video Experts Team (JVET) of ITU-T SG 16 WP 3 and ISO/IEC JTC 1/SC 29/WG 11 19th Meeting: by teleconference, Jun. 22-Jul. 1, 2020, 548 pages.
"Series H: Audiovisual and Multimedia Systems Infrastructure of audiovisual services—Coding of moving video Versatile supplemental enhancement information messages for coded video bitstreams," Recommendation ITU-T H.274, Aug. 2020, 86 pages.
Document: JVET-S2007-v7, Boyce, J., et al., "Versatile supplemental enhancement information messages for coded video bitstreams (Draft 5)," Joint Video Experts Team (JVET) of ITU-T SG 16 WP 3 and ISO/IEC JTC 1/SC 29/WG 11 18th Meeting: by teleconference, Apr. 15-24, 2020.
"Information technology—Coding of audio-visual objects—Part 12: ISO base media file format," ISO/IEC 14496-12, Seventh Edition, Jan. 2022, 264 pages.
Qualcomm Incorporated, "Editor's Version of Dash Is 4th Edition," ISO/IEC JTC1/SC29/WG11 MPEG2019/m52458, Jan. 2020, Brussels, BE, 287 pages.
"Information technology—Coding of audio-visual objects—Part 15: Carriage of network abstraction layer (NAL) unit structured video in the ISO base media file format," ISO/IEC 14496-15:2021(E) ISO/IEC JTC 1/SC 29/WG 03, 2021, 282 pages.
"Information technology—High efficiency coding and media delivery in heterogeneous environments—Part 12: Image File Format—Amendment 2: Support for VVC EVC, slideshows and other improvements," ISO/IEC 23008-12: 2017/DAM 2:2021(E), 2021, 43 pages.
"Information technology—Coding of audio-visual objects—Part 15: Carriage of network abstraction layer (NAL) unit structured video in the ISO base media file format—Amendment 2: Carriage of VVC and EVC in ISOBMFF," ISO/IEC 14496-15:2019(E) Amendment 2, 2019, 64 pages.
"Information technology—High efficiency coding and media delivery in heterogeneous environments—Part 12: Image File Format—Amendment 3: Support for VVC, EVC, slideshows and other improvements (CD stage)," ISO/IEC JTC 1/SC 29/WG 03 output document N0038, ISO/IEC 23008-12:2017/CDAM 2:2020(E), 2020, 29 pages.
International Search Report from PCT Application No. PCT/CN2022/086782 dated Jun. 29, 2022, 10 pages.
International Search Report and Written Opinion for International Application No. PCT/CN2025/073223, mailed Apr. 25, 2025, 14 pages.
International Search Report and Written Opinion for International Application No. PCT/CN2025/073311, mailed Apr. 11, 2025, 14 pages.

* cited by examiner

MINIMIZING INITIALIZATION DELAY IN LIVE STREAMING

CROSS-REFERENCE TO RELATED APPLICATIONS

This application is a continuation of International Patent Application No. PCT/CN2022/086782 filed on Apr. 14, 2022 which claims the priority to and benefits of International Patent Application No. PCT/CN2021/087646 filed on Apr. 16, 2021. All the aforementioned patent applications are hereby incorporated by reference in their entireties.

TECHNICAL FIELD

The present disclosure relates to generation, storage and consumption of digital audio video media information in a file format.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present disclosure discloses techniques that can be used by video encoders and decoders for processing coded representation of a video or an image according to a MPD.

A first aspect relates to a method for processing media data, comprising: identifying in a media presentation description (MPD) an indication of a Tuning-In Media Segment, wherein the Tuning-In Media Segment comprises a latest media data for a client device to start with when tuning into an ongoing live streaming service, wherein the latest media data is selected from either a current media segment that is being generated by the ongoing live streaming service or a previous media segment generated by the ongoing live streaming service based on a length of the current media segment, and wherein the MPD is stored by the client device prior to the client device tuning into the ongoing live streaming service; and performing a conversion between a visual media data and a bitstream according to the MPD.

Optionally, in any of the preceding aspects, another implementation of the aspect provides that the Tuning-In Media Segment comprises an initialization segment concatenated with a single media segment.

Optionally, in any of the preceding aspects, another implementation of the aspect provides that the single media segment is a Simple Media Segment.

Optionally, in any of the preceding aspects, another implementation of the aspect provides that the single media segment is a Delivery Unit Media Segment.

Optionally, in any of the preceding aspects, another implementation of the aspect provides that the single media segment is an Indexed Unit Media Segment.

Optionally, in any of the preceding aspects, another implementation of the aspect provides that the single media segment is a Random Access Media Segment.

Optionally, in any of the preceding aspects, another implementation of the aspect provides that the single media segment comprises a first access unit of a first movie fragment in each track of the single media segment corresponding to an Index of the first access unit (Isau) of a Stream Access Point (SAP) of type 1, 2, or 3.

Optionally, in any of the preceding aspects, another implementation of the aspect provides that the type indicates that the single media segment comprises a closed group of pictures (GOP).

Optionally, in any of the preceding aspects, another implementation of the aspect provides that the type indicates that the single media segment comprises an open group of pictures (GOP).

Optionally, in any of the preceding aspects, another implementation of the aspect provides that the type indicates that the single media segment excludes a particular type of segment.

Optionally, in any of the preceding aspects, another implementation of the aspect provides that the particular type of segment is a gradual decoding refresh segment.

Optionally, in any of the preceding aspects, another implementation of the aspect provides that MPD comprises a syntax element for specifying of a location of the Tuning-In Media Segment.

Optionally, in any of the preceding aspects, another implementation of the aspect provides that the syntax element is an optional element to the Segmentbase element.

Optionally, in any of the preceding aspects, another implementation of the aspect provides that the syntax element is an optional attribute to the SegmentTemplate element.

Optionally, in any of the preceding aspects, another implementation of the aspect provides that the MPD comprises encoding of one or more representations, and wherein a representation comprises at most one of the Tuning-In Media Segment.

Optionally, in any of the preceding aspects, another implementation of the aspect provides that a presence of the Tuning-In Media Segment is indicated in the MPD by the presence of a SegmentBase.TuningIn element, a SegmentList.TuningIn element, a SegmentTemplate.TuningIn element, or a SegmentTemplate.TuningIn attribute.

Optionally, in any of the preceding aspects, another implementation of the aspect provides that the MPD comprises a SegmentTimeline element and a SegmentTemplate.media attribute that includes a $Number$ identifier when a representation comprises the Tuning-In Media Segment.

Optionally, in any of the preceding aspects, another implementation of the aspect provides that the SegmentBase.TuningIn element specifies a location and a byte range for the Tuning-In Media Segment.

Optionally, in any of the preceding aspects, another implementation of the aspect provides that the SegmentTemplate.TuningIn attribute specifies a template to create the Tuning-In Media Segment, and wherein neither a $Number$ identifier nor a $Time$ identifier shall be included.

Optionally, in any of the preceding aspects, another implementation of the aspect provides that the method further comprises identifying a live streaming tuning-in event that signals a segment number and an earliest presentation time of the Tuning-In Media Segment.

A second aspect relates to an apparatus for processing video data comprising a processor and a non-transitory memory with instructions thereon, wherein the instructions upon execution by the processor, cause the processor to perform the method of any of the preceding aspects.

A third aspect relates to a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

A fourth aspect relates to a non-transitory computer-readable recording medium storing a bitstream of a video which is generated by a method performed by a video processing apparatus, wherein the method comprises: identifying in an MPD an indication of a Tuning-In Media Segment, wherein the Tuning-In Media Segment comprises a latest media data for a client device to start with when tuning into an ongoing live streaming service, wherein the latest media data is selected from either a current media segment that is being generated by the ongoing live streaming service or a previous media segment generated by the ongoing live streaming service based on a length of the current media segment, and wherein the MPD is stored by the client device prior to the client device tuning into the ongoing live streaming service; and generating the bitstream based on the MPD.

A fifth aspect relates to a method for storing bitstream of a video, comprising: identifying in an MPD an indication of a Tuning-In Media Segment, wherein the Tuning-In Media Segment comprises a latest media data for a client device to start with when tuning into an ongoing live streaming service, wherein the latest media data is selected from either a current media segment that is being generated by the ongoing live streaming service or a previous media segment generated by the ongoing live streaming service based on a length of the current media segment, and wherein the MPD is stored by the client device prior to the client device tuning into the ongoing live streaming service; generating the bitstream based on the MPD; and storing the bitstream in a non-transitory computer-readable recording medium.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
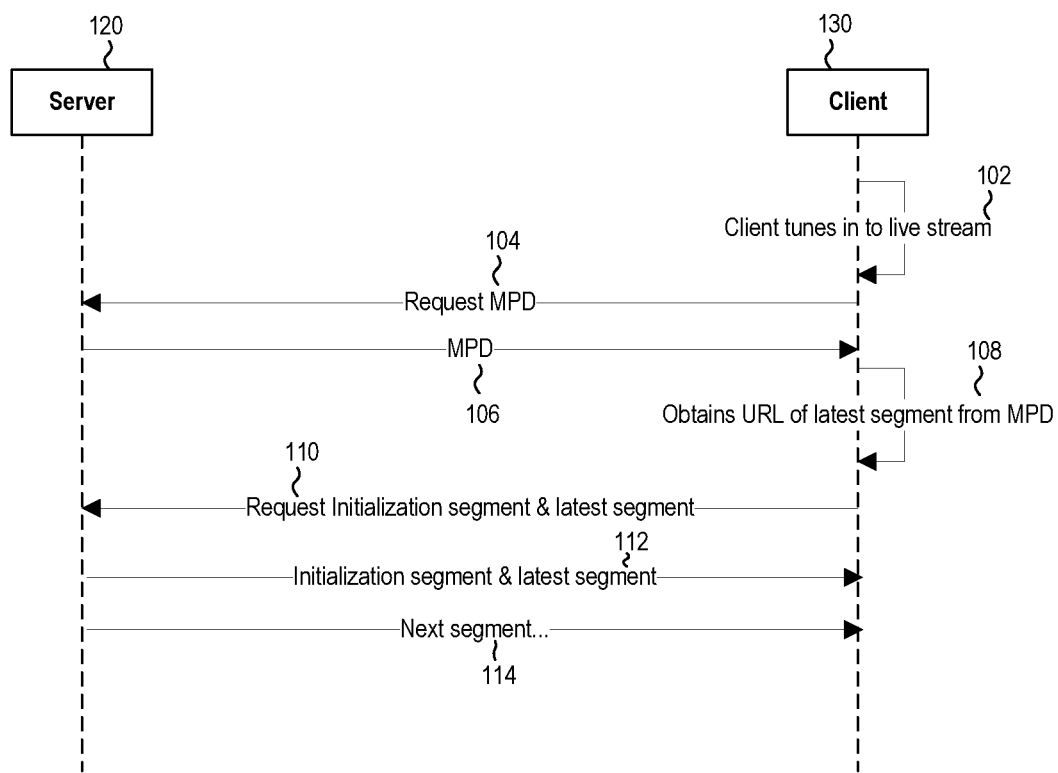
FIG. 1 is a sequence diagram illustrating a process for tuning into a live streaming session in accordance with prior art.

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

Section headings are used in the present disclosure for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also. In the present disclosure, editing changes are shown to text by strikethrough indicating cancelled text and highlight indicating added text (including boldface italic), with respect to the current draft of the Versatile Video Coding (VVC) specification or International Organization for Standardization/International Electrotechnical Commission (ISO/IEC) base media file format (ISOBMFF) file format specification.

The present disclosure is related to video streaming. Specifically, the present disclosure is related to definition of a new type of media segment and related signaling to enable minimizing the initialization delay in live media streaming. The various embodiments may be applied individually or in various combinations, for media streaming systems, e.g., based on the Dynamic Adaptive Streaming over Hypertext Transfer Protocol (DASH) standard or its extensions.

Video Coding Standards.

Video coding standards have evolved primarily through the development of the well-known International Telecommunication Union—Telecommunication Standardization Sector (ITU-T) and ISO/IEC standards. The ITU-T produced H.261 and H.263, ISO/IEC produced Moving Picture Experts Group-1 (MPEG-1) and MPEG-4 Visual, and the two organizations jointly produced the H.262/MPEG-2 Video and H.264/MPEG-4 Advanced Video Coding (AVC) and H.265/High Efficiency Video Coding (HEVC) standards. Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly in 2015. Since then, many new methods have been adopted by JVET and put into the reference software named Joint Exploration Model (JEM). The JVET was later renamed to be the Joint Video Experts Team (JVET) when the VVC project officially started. VVC is the new coding standard, targeting at 50% bitrate reduction as compared to HEVC, that has been finalized by the JVET at its 19th meeting ended on Jul. 1, 2020.

The VVC standard (ITU-T H.266|ISO/IEC 23090-3) and the associated Versatile Supplemental Enhancement Information (VSEI) standard (ITU-T H.274|ISO/IEC 23002-7) have been designed for use in a maximally broad range of applications, including both the traditional uses such as television broadcast, video conferencing, or playback from storage media, and also newer and more advanced use cases such as adaptive bit rate streaming, video region extraction, composition and merging of content from multiple coded video bitstreams, multiview video, scalable layered coding, and viewport-adaptive 360° immersive media.

The Essential Video Coding (EVC) standard (ISO/IEC 23094-1) is another video coding standard that has recently been developed by MPEG.

File Format Standards.

Media streaming applications are typically based on the Internet Protocol (IP), Transmission Control Protocol (TCP), and Hypertext Transfer Protocol (HTTP) transport methods, and typically rely on a file format such as ISOBMFF. One such streaming system is DASH. For using a video format with ISOBMFF and DASH, a file format specification specific to the video format, such as the AVC file format and the HEVC file format described in ISO/IEC 14496-15, would be needed for encapsulation of the video content in ISOBMFF tracks and in DASH representations and segments. Important information about the video bitstreams, e.g., the profile, tier, and level, and many others, would need to be exposed as file format level metadata and/or DASH media presentation description (MPD) for content selection purposes, e.g., for selection of appropriate media segments both for initialization at the beginning of a streaming session and for stream adaptation during the streaming session.

Similarly, for using an image format with ISOBMFF, a file format specification specific to the image format, such as the AVC image file format and the HEVC image file format described in ISO/IEC 23008-12, would be needed.

The VVC video file format, the file format for storage of VVC video content based on ISOBMFF, is currently being developed by MPEG. The latest draft specification of the VVC video file format is included in ISO/IEC JTC 1/SC 29/WG 03 output document N0035.

The VVC image file format, the file format for storage of image content coded using VVC, based on ISOBMFF, is currently being developed by MPEG. The latest draft specification of the VVC image file format is included in ISO/IEC JTC 1/SC 29/WG 03 output document N0038.

Dash

In Dynamic adaptive streaming over HTTP (DASH) as described in ISO/IEC 23009-1, there may be multiple representations for video and/or audio data of multimedia content, different representations may correspond to different coding characteristics (e.g., different profiles or levels of a video coding standard, different bitrates, different spatial resolutions, etc.). The manifest of such representations may be defined in a MPD data structure. A media presentation may correspond to a structured collection of data that is accessible to DASH streaming client device. The DASH streaming client device may request and download media data information to present a streaming service to a user of the client device. A media presentation may be described in the MPD data structure, which may include updates of the MPD.

A media presentation may contain a sequence of one or more periods. Each period may extend until the start of the next Period, or until the end of the media presentation, in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

A typical DASH streaming procedure is shown by the following steps:

The Client Gets the MPD.

The client estimates the downlink bandwidth, and selects a video representation and an audio representation according to the estimated downlink bandwidth and the codec, decoding capability, display size, audio language setting, etc.

Unless the end of the media presentation is reached, the client requests media segments of the selected representations and presents the streaming content to the user.

The client keeps estimating the downlink bandwidth. When the bandwidth changes to a direction (e.g., becomes lower) significantly, the client selects a different video representation to match the newly estimated bandwidth, and unless the end of the media presentation is reached, the client requests media segments of the selected representations and presents the streaming content to the user. The client repeats the process until the stream is terminated or the end of the media presentation is reached.

Technical problems solved by disclosed technical solutions. In live streaming based on DASH, particularly when the live "broadcasters" are users using all kinds of mobile devices, it is often difficult to ensure constant Segment durations. The video camera of the device may capture video at different varying frame rates. The video encoder may skip a frame from time to time due to computing resource issues. Therefore, it is not always possible to use the simple and nice approach based on the @duration attribute that specifies the constant approximate Segment duration. Consequently, many live streaming services are forced to use the SegmentTimeline element.

However, using SegmentTimeline often requires a client to request the latest MPD whenever tuning into a live streaming session, even if the client prefetched an earlier version of the MPD. Basically, as illustrated in FIG. 1, at step 102, when a client 130 tunes into a live streaming session, the client firstly, at step 104, requests the latest MPD from a server 120. The server 120 transmits, at step 106, the MPD to the client 120. The client 120 receives the MPD and obtains the URL information of the latest Media Segment at step 108. The client 120, at step 110, then requests the Initialization Segment and the latest Media Segment from the server 120. The server 120 transmits the Initialization Segment and the latest Media Segment to the client 120 at step 112, which gets processed and displayed on the client 120. The live stream continues from there with the server 120 sending the next media segment at step 114, and so forth. This need of multiple roundtrips and multiple requests causes additional initialization delay (the delay between the time moments when a user tunes in (e.g., presses the "Start"/"Join" button) and when the first picture is displayed) compared to the case when it is possible to use the @duration attribute and the $number$-identifier-based URL template for Segments.

To address the above-described problem, and others, disclosed herein are various embodiments for minimizing the initialization delay in live streaming. Novel aspects of the disclosed embodiments include, but are not limited to:

1) A new type of media segment named Tuning-In Media Segment (TIMS).
2) The addition of an optional element to the SegmentBase element, for specifying the URL for the Tuning-In Media Segment.
3) The addition of an optional attribute to the SegmentTemplate element, for specifying the URL for the Tuning-In Media Segment.
4) The definition of Live Streaming Tuning-In Event, for signaling of the segment number and the earliest presentation time of the Tuning-In Media Segment using the 'emsg' box.

A TIMS contains Tuning-In Media Segment comprises a latest media data for a client device to start with when tuning into an ongoing live streaming service. Furthermore, various features of the disclosed embodiments can be applied individually or combined in any manner. The disclosed embodiments should be considered as examples to explain the general concepts and should not be interpreted in a narrow way.

Example 1

In an embodiment, a TIMS is the concatenation of an Initialization Segment and a single Simple Media Segment with the first access unit of the first movie fragment in each track of the Simple Media Segment corresponding to the Index of the first access unit (Isau) of a Stream Access Point (SAP) of type 1, 2, or 3. These types may indicate, for example, coded video segments that are either closed group of pictures (GOP) or open GOP, but exclude other segments such as gradual decoding refresh segments.

Example 2

In another embodiment, a TIMS is the concatenation of an Initialization Segment and a single Media Segment of another type with the first access unit of the first movie fragment in each track of the Media Segment corresponding to the of a Stream Access Point (SAP) of type 1, 2, or 3. As non-limiting examples, the other type of Media Segment may be a Delivery Unit Media Segment, an Indexed Media Segment, or a Random Access Media Segment.

Figure 2:
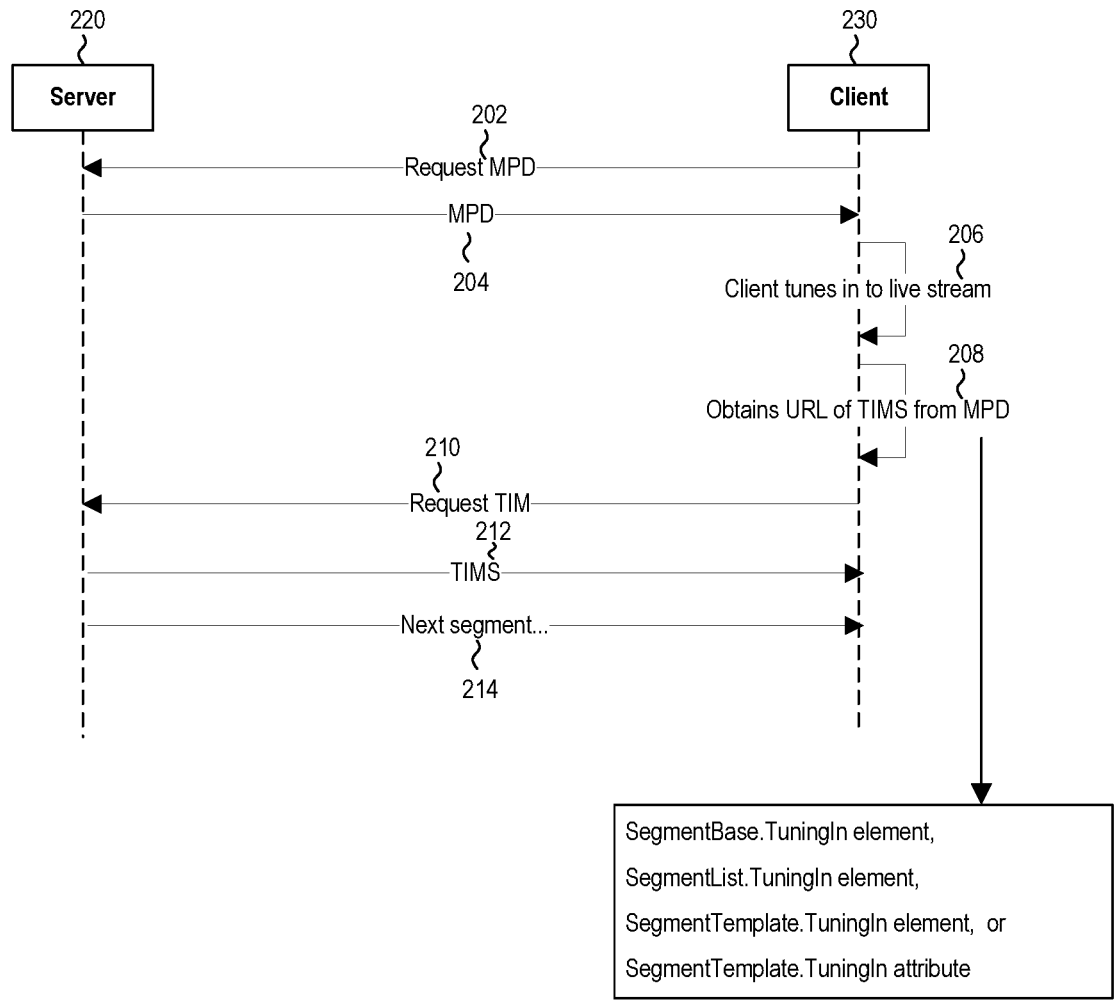
FIG. 2 is a sequence diagram illustrating a process for tuning into a live streaming session in accordance with some embodiments of the present disclosure.

Referring now to FIG. 2, using the disclosed aspects, for live streaming using the SegmentTimeline element, when the MPD is prefetched (e.g., as shown in steps 202 and 204 of FIG. 2), a client 230 would be able to tune in and start consuming the first Media Segment by sending only one HTTP request, and there is no need to request an MPD update each time before requesting a next Media Segment. For example, when the client 230 tunes in to the live stream session at step 206, the client, at step 208, obtains the URL of the TIMS from the prefetched MPD file and sends only one HTTP request for the TIMS at step 210. As further described below, the presence of a TIMS may be indicated in the MPD with either a SegmentBase.TuningIn element, SegmentList.TuningIn element, SegmentTemplate.TuningIn element, or SegmentTemplate.TuningIn attribute. When the client 230 receives the TIMS from the server 220, the client 230 can start processing and displaying the live stream, and continues so forth with the next segment 214. By using such a design, as observed from experiment results, the initialization delay could be reduced from 1110 ms to 848 ms, which is a 23.6% reduction.

Embodiments of the present disclosure can be applied to DASH. In particular, the disclosed embodiments (e.g., clause reference number) are described relative to the 4th edition text of the DASH standard specification in MPEG input document m52458, but are not limited that particular edition of the DASH standard specification. The most relevant parts that have been added or modified are highlighted in boldface underline, and some of the deleted parts are highlighted using. There may be some other changes that are editorial in nature and thus not highlighted.

5.3.9.2 Segment base information. The SegmentBase element is sufficient to describe the Segment Information if and only if a single Media Segment is provided per Representation and the Media Segment URL is included in the BaseURL element.

In case multiple Media Segments are present, either a SegmentList or a SegmentTemplate shall be used to describe the Segment Information. SegmentList or a SegmentTemplate share the multiple Segment base information as provided in subclause 5.3.9.2.2, Table 16.

If the Representation contains more than one Media Segment, then either the attribute @duration or the element SegmentTimeline shall be present. The attribute @duration and the element SegmentTimeline shall not be present at the same time.

Segments described by the Segment base information are referenced by an HTTP-URL conforming to the type URLType as defined in Table 17.

The semantics of the attributes and elements for the SegmentBase element and the Segment base information are provided in subclause 5.3.9.2.2, Table 15, and the multiple Segment base information in Table 16 in subclause 5.3.9.2.2.

The XML syntax of the Segment Base Information is provided in subclause 5.3.9.2.3.

5.3.9.2.2 Semantics

TABLE 15

Semantics of SegmentBase element and Segment Base Information type

| Element or Attribute Name | Use | Description |
|---|---|---|
| SegmentBase *Segment Base Information* | | specifies Segment base element. This element also specifies the type for the Segment base information that is the base type for other elements. |
| @timescale | O | specifies the timescale in units per seconds to be used for the derivation of different real-time duration values in the Segment Information. If not present on any level, it shall be set to 1. NOTE This can be any frequency but typically is the media clock frequency of one of the media streams (or a positive integer multiple thereof). |
| @presentationTimeOffset | O | specifies the presentation time offset of the Representation relative to the start of the Period, i.e., the presentation time value of the media stream that shall be presented at the start of this Period. The value of the presentation time offset in seconds is the division of the value of this attribute and the value of the @timescale attribute. If not present on any level, the value of the presentation time offset is 0. |
| @eptDelta | O | specifies the difference between the earliest presentation time in the Representation and the value of the @presentationTimeOffset. The value of the earliest presentation time of the first Media Segment in this Representation in seconds is computed the sum of the value of this attribute and the value of the @presentationTimeOffset in units of the @timescale attribute. If not present on any level, but the SegmentTimeline element is present, then the value is the value of the @t attribute of the first S element in the Segment minus the value of the @presentationTimeOffset. Otherwise, it assumed to be 0. |
| @presentationDuration | O | specifies the presentation duration of the Representation in the Period. The value of the presentation duration in seconds is the division of the value of this attribute and the value of the @timescale attribute. Specifically, the sum of the value of the @presentationTimeOffset, if present, or 0 otherwise and the value of this attribute is the last presentation time to be presented for this Representation. If not present on any level, the value of this attribute is unknown and the Representation should be presented until the end of the Period, i.e., until the presentation is terminated or until the next Period starts. |
| @timeShiftBufferDepth | O | specifies the duration of the time shifting buffer for this Representation that is guaranteed to be available for a Media Presentation with type 'dynamic'. When not present, the value is of the @timeShiftBufferDepth on MPD level applies. If present, this value shall be not smaller than the |

TABLE 15-continued

Semantics of SegmentBase element and Segment Base Information type

| Element or Attribute Name | Use | Description |
|---|---|---|
| | | value on MPD level. This value of the attribute is undefined if the @type attribute is equal to 'static'. NOTE When operating in a time-shift buffer on a Representation with value larger than the time-shift buffer signalled on MPD level, not all Representations are necessarily available for switching. |
| @indexRange | O | specifies the byte range that contains the Segment Index in all Media Segments of the Representation. The byte range shall be expressed and formatted as a byte-range-spec as defined in IETF RFC 7233: 2014, subclause 2.1. It is restricted to a single expression identifying a contiguous range of bytes. If not present, the value is unknown. |
| @indexRangeExact | OD default "false" | when set to 'true' specifies that for all Segments in the Representation, the data outside the prefix defined by @indexRange contains the data needed to access all access units of all media streams syntactically and semantically. This attribute shall not be present if @indexRange is absent. |
| @availabilityTimeOffset | O | specifies an offset to define the adjusted segment availability time. The value is specified in seconds, possibly with arbitrary precision. The offset provides the time how much earlier these segments are available compared to their computed availability start time for all Segments of all associated Representation. The segment availability start time defined by this value is referred to as adjusted segment availability start time. For details on computing the adjusted segment availability start time, refer to subclause 5.3.9.5. If not present, no adjusted segment availability start time is defined. NOTE The value of "INF" implies availability of all segments starts at MPD@availabilityStartTime. |
| @availabilityTimeComplete | O | specifies if all Segments of all associated Representation are complete at the adjusted availability start time. The attribute shall be ignored if @availabilityTimeOffset is not present on any level. If not present on any level, the value is inferred to true. NOTE If the value is set to false, then it can be inferred by the client that the segment is available at its announced location prior being complete. |
| Initialization | 0 . . . 1 | specifies the URL including a possible byte range for the Initialization Segment. For the type definition, refer to Table 17. |
| TuningIn | 0 . . . 1 | specifies the URL including a possible byte range for the Tuning-In Media Segment. Alternatively, this specifies the URL for the Tuning-In Media Segment. For the type definition, refer to Table 17. |
| RepresentationIndex | 0 . . . 1 | specifies the URL including a possible byte range for the Representation Index Segment. For the type definition, refer to Table17. |

TABLE 15-continued

Semantics of SegmentBase element and Segment Base Information type

| Element or Attribute Name | Use | Description |
|---|---|---|
| FailoverContent | 0 . . . 1 | specifies times where the content has been replaced by failover content, for example because of an encoder error. For details refer to 5.3.9.7. |

Key
For attributes: M = mandatory, O = optional, OD = optional with default value, CM = conditionally mandatory
For elements: <minOccurs> . . . <maxOccurs> (N = unbounded)
Elements are bold; attributes are non-bold and preceded with an @.

TABLE 16

Semantics of MultipleSegmentBaseInformation type

| Element or Attribute Name | Use | Description |
|---|---|---|
| *MultipleSegmentBaseInformation* | | specifies multiple Segment base information. |
| @duration | O | If present, specifies the constant approximate Segment duration. All Segments within this Representation element have the same duration unless it is the last Segment within the Period, which can be significantly shorter. The value of the duration in seconds is the division of the value of this attribute and the value of the @timescale attribute associated to the containing Representation. For more details, refer to subclause 5.3.9.5.3. |
| @startNumber | O | specifies the number of the first Media Segment in this Representation in the Period. For details, refer to subclause 5.3.9.5.3. |
| @endNumber | O | specifies the number of the last Media Segment in this Representation in the Period. If not present, the number is inferred from the duration of the Period. For details refer to 5.3.9.5.3. |
| *Segment Base Information* | | specifies Segment base information. |
| SegmentTimeline | 0 . . . 1 | specifies the timeline of arbitrary Segment durations For more details, see subclause 5.3.9.6. |
| BitstreamSwitching | 0 . . . 1 | specifies the URL including a possible byte range for the Bitstream Switching Segment. For the type definition, refer to Table 17 |

Key
For attributes: M = mandatory, O = optional, OD = optional with default value, CM = conditionally mandatory For elements: <minOccurs> . . . <maxOccurs> (N = unbounded) Elements are bold; attributes are non-bold and preceded with an @.

TABLE 17

Semantics of elements of type URLType

| Element or Attribute Name | Use | Description |
|---|---|---|
| Element of type URLType | | defines an HTTP-URL |
| @sourceURL | O | specifies the source URL part and shall be formatted either as an <absolute-URI> according to IETF RFC 3986: 2005, subclause 4.3, with a fixed scheme of "http" or "https" or as a <relative-ref> according to IETF RFC 3986: 2005, subclause 4.2. |

TABLE 17-continued

Semantics of elements of type URLType

| Element or Attribute Name | Use | Description |
|---|---|---|
| | | If not present, then any BaseURL element is mapped to the @sourceURL attribute and the range attribute shall be present. |
| @range | O | specifies the byte range restricting the above HTTP-URL.<br>The byte range shall be expressed and formatted as a byte-range-spec as defined in IETF RFC 7233: 2014, subclause 2.1. It is restricted to a single expression identifying a contiguous range of bytes.<br>If not present, the element refers to the entire resource referenced in the @sourceURL attribute. |

5.3.9.2.3 XML Syntax

```
<!-- Segment information base -->
<xs:complexType name="SegmentBaseType">
<xs:sequence>
<xs:element name="Initialization" type="URLType" minOccurs="0"/>
<xs:element name="TuningIn" type="URLType" minOccurs="0"/>
<xs:element name="RepresentationIndex" type="URLType" minOccurs="0"/>
<xs:element name="FailoverContent" type="FailoverContentType" minOccurs="0"/>
<xs:any namespace="##other" processContents="lax" minOccurs="0"
maxOccurs="unbounded"/>
</xs:sequence>
<xs:attribute name="timescale" type="xs:unsignedInt"/>
<xs:attribute name="eptDelta" type="xs:integer"/>
<xs:attribute name="presentationTimeOffset" type="xs:unsignedLong"/>
<xs:attribute name="presentationDuration" type="xs:unsignedLong"/>
<xs:attribute name="timeShiftBufferDepth" type="xs:duration"/>
<xs:attribute name="indexRange" type="SingleRFC7233RangeType"/>
<xs:attribute name="indexRangeExact" type="xs:boolean" default="false"/>
<xs:attribute name="availabilityTimeOffset" type="xs:double"/>
<xs:attribute name="availabilityTimeComplete" type="xs:boolean"/>
<xs:anyAttribute namespace="##other" processContents="lax"/>
</xs:complexType>
<!-- Multiple Segment information base -->
<xs:complexType name="MultipleSegmentBaseType">
<xs:complexContent>
<xs:extension base="SegmentBaseType">
<xs:sequence>
<xs:element name="SegmentTimeline" type="SegmentTimelineType" minOccurs="0"/>
<xs:element name="BitstreamSwitching" type="URLType" minOccurs="0"/>
</xs:sequence>
<xs:attribute name="duration" type="xs:unsignedInt"/>
<xs:attribute name="startNumber" type="xs:unsignedInt"/>
<xs:attribute name="endNumber" type="xs:unsignedInt"/>
</xs:extension>
</xs:complexContent>
</xs:complexType>
<!-- Segment Info item URL/range -->
<xs:complexType name="URLType">
<xs:sequence>
<xs:any namespace="##other" processContents="lax" minOccurs="0"
maxOccurs="unbounded"/>
</xs:sequence>
<xs:attribute name="sourceURL" type="xs:anyURI"/>
<xs:attribute name="range" type="SingleRFC7233RangeType"/>
<xs:anyAttribute namespace="##other" processContents="lax"/>
</xs:complexType>
<xs:simpleType name="SingleRFC7233RangeType">
<xs:restriction base="xs:string">
<xs:pattern value="([0-9]*)(\-([0-9]*))?"/>
</xs:restriction>
</xs:simpleType>
```

5.3.9.4 Segment template. The Segment template is defined by the SegmentTemplate element. In this case, specific identifiers that are substituted by dynamic values assigned to Segments, to create a list of Segments. The substitution rules are provided in subclause 5.3.9.4.4.

The semantics of the attributes and elements for the Segment list are provided in subclause 5.3.9.4.2 Table 19. The XML syntax of the Segment Information is provided in subclause 5.3.9.4.3.

5.3.9.4.2 Semantics

TABLE 19

Semantics of SegmentTemplate element

| Element or Attribute Name | Use | Description |
|---|---|---|
| SegmentTemplate | | specifies Segment template information. |
| *MultipleSegmentBaseInformation* | | Provides the Multiple Segment base information as defined in subclause 5.3.9.2. |
| @media | O | specifies the template to create the Media Segment List. For more details, refer to subclause 5.3.9.4.4. |
| @index | O | specifies the template to create the Index Segment List. If neither the $Number$ nor the $Time$ identifier is included, this provides the URL to a Representation Index. For more details, refer to subclause 5.3.9.4.4. |
| @initialization | O | specifies the template to create the Initialization Segment. Neither $Number$ nor the $Time$ identifier shall be included. For more details, refer to subclause 5.3.9.4.4. |
| <u>@tuningIn</u> | <u>O</u> | specifies the template to create the Tuning-In Media Segment. Neither $Number$ nor the $Time$ identifier shall be included. For more details, refer to subclause 5.3.9.4.4. |
| @bitstreamSwitching | O | specifies the template to create the Bitstream Switching Segment. Neither $Number$ nor the $Time$ identifier shall be included. For more details, refer to subclause 5.3.9.4.4. |

Key
For attributes: M = mandatory, O = optional, OD = optional with default value, CM = conditionally mandatory For elements: <minOccurs> . . . <maxOccurs> (N = unbounded)
Elements are bold; attributes are non-bold and preceded with an @.

5.3.9.4.3 XML Syntax

```
<!-- Segment Template -->
<xs:complexType name="SegmentTemplateType">
<xs:complexContent>
<xs:extension base="MultipleSegmentBaseType">
<xs:attribute name="media" type="xs:string"/>
<xs:attribute name="index" type="xs:string"/>
<xs:attribute name="initialization" type="xs:string"/>
<xs:attribute name="tuningIn" type="xs:string"/>
<xs:attribute name="bitstreamSwitching" type="xs:string"/>
</xs:extension>
</xs:complexContent>
</xs:complexType>
```

5.3.9.4.4 Template-Based Segment URL Construction

The SegmentTemplate@media attribute, the SegmentTemplate@index attribute, the SegmentTemplate@initialization attribute, the SegmentTemplate@tuningIn attribute and the SegmentTemplate@bitstreamSwitching attribute each contain a string that may contain one or more of the identifiers as listed in Table 20.

In each URL, the identifiers from Table 20 shall be replaced by the substitution parameter defined in Table 16. Identifier matching is case-sensitive. If the URL contains unescaped $ symbols which do not enclose a valid identifier, then the result of URL formation is undefined. In this case, it is expected that the DASH Client ignores the entire containing Representation element and the processing of the MPD continues as if this Representation element was not present. The format of the identifier is also specified in Table 20.

Each identifier may be suffixed, within the enclosing '$' characters, with an additional format tag aligned with the printf format tag as defined in IEEE 1003.1-2008[10] following this prototype:

%0[width]d

The width parameter is an unsigned integer that provides the minimum number of characters to be printed. If the value to be printed is shorter than this number, the result shall be padded with zeros. The value is not truncated even if the result is larger.

The Media Presentation shall be authored such that the application of the substitution process results in valid Segment URLs.
Strings outside identifiers shall only contain characters that are permitted within URLs according to IETF RFC 3986.

TABLE 5

Identifiers for URL templates

| $<Identifier>$ | Substitution parameter | Format |
| --- | --- | --- |
| $$ | Is an escape sequence, i.e., "$$" is replaced with a single "$" | not applicable |
| $RepresentationID$ | This identifier is substituted with the value of the attribute Representation@id of the containing Representation. | The format tag shall not be present. |
| $Number$ | This identifier is substituted with the number of the corresponding Segment, if $SubNumber$ is not present in the same string. If $SubNumber$ is present, this identifier is substituted with the number of the corresponding Segment sequence. For details, refer to subclauses 5.3.9.6.4 and 5.3.9.6.5. | The format tag may be present. If no format tag is present, a default format tag with width = 1 shall be used. |
| $Bandwidth$ | This identifier is substituted with the value of Representation@bandwidth attribute value. | The format tag may be present. If no format tag is present, a default format tag with width = 1 shall be used. |
| $Time$ | This identifier is substituted with the value of the MPD start time of the Segment being accessed. For the Segment Timeline, this means that this identifier is substituted with the value of the SegmentTimeline@t attribute for the Segment being accessed. Either $Number$ or $Time$ may be used but not both at the same time. | The format tag may be present. If no format tag is present, a default format tag with width = 1 shall be used. |
| $SubNumber$ | This identifier is substituted with the number of the corresponding Segment in a Segment Sequence. This identifier shall only be present if either $Number$ or $Time$ are present as well. For details, refer to subclauses 5.3.9.6.4 and 5.3.9.6.5. | The format tag may be present. If no format tag is present, a default format tag with width = 1 shall be used. |

5.3.9.5.6 Tuning-In Media Segment Information

Each Representation has assigned at most one Tuning-In Media Segment. Alternatively, each Representation has assigned at zero or more Tuning-In Media Segments.

The presence of a Tuning-In Media Segment is indicated by the presence of SegmentBase.TuningIn, SegmentList.TuningIn, the SegmentTemplate.TuningIn element or the SegmentTemplate.TuningIn attribute that may contain URL and byte range information or URL construction rules for the Tuning-In Media Segment.

When a Tuning-In Media Segment is present for a Representation, it is recommended that the SegmentTemplate@media attribute with the $Number$ identifier is used, and the SegmentTimeline element is used.

5.10.4 DASH-Specific Events

5.10.4.7 Live Streaming Tuning-In Event

A live streaming tuning-in event indicates that the current Segment is a Tuning-In Media Segment. This event is identified by the URN "urn:mpeg:dash:event:tuin:2021".

For events using this schema, the 'emsg'.message data[ ] field contains the DASHTuningIn structure defined below:

```
aligned(8) struct DASHTuningIn
{
unsigned int(32) segment number;
unsigned int(64) earliest_presentation_time;
}
``` segment number provides the Segment number of the Media Segment part of the Tuning-In Media Segment.
earliest presentation time provides the earlier presentation time of any access unit in the Tuning-In Media Segment. The timescale is provided in the timescale field of the current 'emsg' box.

Alternatively, the field earliest presentation time is not included in the DASHTuningIn structure.

6.3.4 Media Segment Types

6.3.4.1 General

Media Segments can be of different types: Delivery Unit Media Segments, simple Media Segments, Random Access Media Segments, Switching Media Segments, Indexed Media Segments, Sub-Indexed Media Segments, and Tuning-In Media Segments.

All Media Segments shall conform to the general definitions in subclause 6.3.4.2. Additional type-specific constraints are provided further below in subclause 6.3.4.

Further rules on Media Segments in combination with certain MPD attributes are provided in subclause 7.3.

Media Segments may conform to multiple types. Conformance can be expressed by adding the brand(s) to the 'styp' box as a compatible brand and, if applicable, as the major brand.

Unless explicitly mentioned differently, the boxes referred in subclause 6.3.4 are specified in ISO/IEC 14496-12.

6.3.4.2 Delivery Unit Media Segment

A Media Segment conforming to the Delivery Unit Media Segment Format is defined as follows:
  Each Media Segment shall contain one or more whole self-contained movie fragments. A whole, self-contained movie fragment is a movie fragment ('moof') box and a media data ('mdat') box that contains all the media samples that do not use external data references referenced by the track runs in the movie fragment box.
  Each 'moof' box shall contain at least one track fragment.
  The 'moof' boxes shall not use external data references, the flag 'default-base-is-moof' shall be set, and data-offset shall be used, i.e., 'base-data-offset-present' shall not be used. This combination of settings is referred to as movie-fragment relative addressing for media data. Absolute byte-offsets shall not be used for this media data.
  In a movie fragment, the duration by which each track extends should be as close to equal as practical. In particular, as movie fragments are accumulated, the track durations should remain close to each other and there should be no 'drift'.
  Each Media Segment may carry 'dums' in the Segment Type box ('styp') as a compatible brand. The conformance requirements of this brand are defined in this subclause.

6.3.4.3 Simple Media Segment

A Media Segment conforming to the Simple Media Segment Format for DASH is defined as follows:
  It shall conform to the Delivery Unit Media Segment format as specified in subclause 6.3.4.2.
  Each 'traf' box shall contain a 'tfdt' box.
  NOTE The track fragment adjustment box 'tfad' as defined in 3GPP TS26.244 can also be present. DASH Clients are discouraged to apply both the alignment established by the 'tfdt' and the time-shifting implied by the 'tfad', which would result in a double correction.
  Each Simple Media Segment may contain one or more 'sidx' boxes. If present, the first 'sidx' box shall be placed before any 'moof' box and the first Segment Index box shall document the entire Segment.
  For the purpose of determining overlapping and non-overlapping segments, redundant samples as defined in ISO/IEC 14496-12 shall be ignored. In other words, the earliest presentation time of any access unit in the stream shall be computed without taking redundant samples into account.
  Each Media Segment may contain a 'styp' box and if present shall carry 'msdh' as a compatible brand. The conformance requirement of this brand is defined in this subclause.

6.3.4.4 Indexed Media Segment

A Media Segment conforming to the Indexed Media Segment Format is defined as follows:
  Each Media Segment shall comply with the Delivery Unit Media Segment as defined in subclause 6.3.4.2 and in addition in each self-contained movie fragment, the movie fragment ('moof') box is immediately followed by its corresponding media data ('mdat').
  Each Media Segment shall contain one or more 'sidx' boxes. The first 'sidx' box shall be placed before any 'moof' box and shall document Subsegments that span the composition time of the entire Segment.
  Each Media Segment shall carry 'msix' as a compatible brand. The conformance requirements of this brand are defined in this subclause.

6.3.4.5 Sub-Indexed Media Segment

A Media Segment conforming to the Sub-Indexed Media Segment Format is defined as follows:
  It shall conform to the indexed Media Segment format as specified in subclause 6.3.4.3.
  The Subsegment Index box ('ssix') shall be present and shall follow immediately the 'sidx' box that documents the same Subsegment. This immediately preceding 'sidx' shall only index Media Subsegments.
  It shall carry 'sims' in the Segment Type box ('styp') as a compatible brand. The conformance requirements of this brand are defined in this subclause.

6.3.4.6 Random Access Media Segment

A Media Segment conforming to the Random Access Media Segment Format is defined as follows:
  It shall conform to the Simple Media Segment format as specified in subclause 6.3.4.3.
  The first access unit in each movie fragment in a Random Access Media Segment shall correspond to the Isau of a SAP of type 1, 2, or 3.
  The media segment shall carry sufficient information to access the media in the stream, e.g., all necessary encryption in combination with the Initialization Segment, if available.

6.3.4.7 Tuning-In Media Segment

The Tuning-In Media Segment conforms to the concatenation of an Initialization Segment (as specified in subclause 6.3.3) and a single Simple Media Segment (as specified in subclause 6.3.4.3) with the first access unit of the first movie fragment in each track of the Simple Media Segment corresponding to the Isau of a SAP of type 1, 2, or 3.

When MPD@type is "dynamic", a Tuning-In Media Segment contains the latest media data for clients to start with when tuning into the ongoing live streaming service.

Depending on the length of the current Media Segment that is being generated by the server, the Media Segment in the Tuning-In Media Segment can be either the current Media Segment (e.g., when the current Media Segment is made available with at least a couple of seconds of media data encapsulated) or the previous Media Segment (e.g., when only a small part of the current Media Segment has been generated).

8.11.2 Media Presentation Description Constraints 8.11.2.5 Constraints on SegmentTemplate Elements The @initialization attribute and the @tuningIn attribute may include data URLs as defined in IETF RFC 2397.

Figure 3:
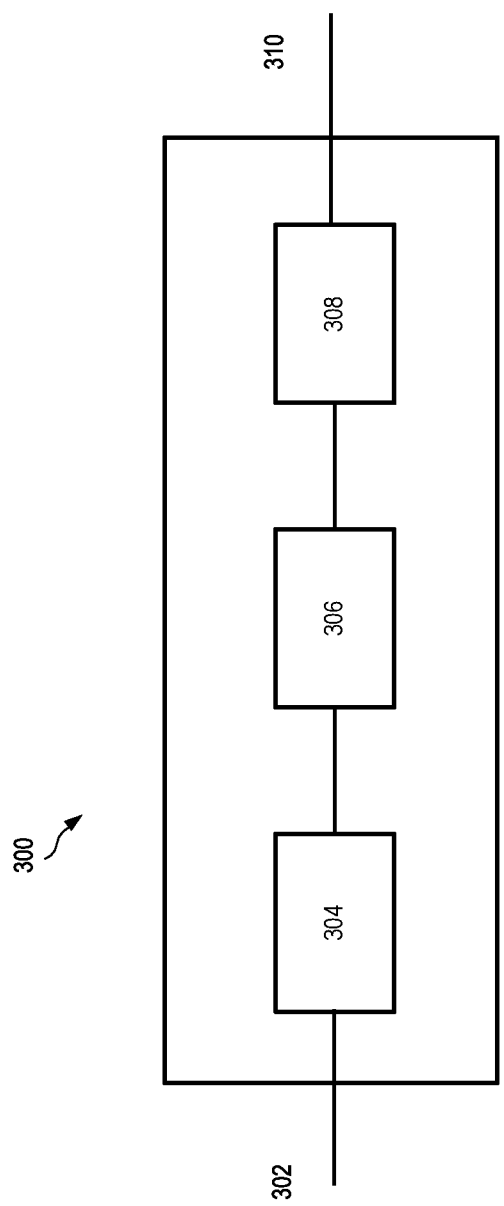
FIG. 3 is a block diagram of an example video processing system in accordance with some embodiments of the present disclosure.

FIG. 3 is a block diagram showing an example video processing system 300 in which various techniques disclosed herein may be implemented. Various implementations may include some or all of the components of the system 300. The system 300 may include input 302 for receiving video content. The video content may be received in a raw or uncompressed format, e.g., 8 or 10 bit multi-component pixel values, or may be in a compressed or encoded format. The input 302 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 300 may include a coding component 304 that may implement the various coding or encoding methods described in the present disclosure. The coding component 304 may reduce the average bitrate of video from the input 302 to the output of the coding component 304 to produce a coded representation of the video. The coding techniques are therefore sometimes called video compression or video transcoding techniques. The output of the coding component 304 may be either stored, or transmitted via a communication connected, as represented by the component 306. The stored or communicated bitstream (or coded) representation of the video received at the input 302 may be used by the component 308 for generating pixel values or displayable video that is sent to a display interface 310. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment serial advanced technology attachment (SATA), peripheral component interconnect (PCI), integrated drive electronics (IDE) interface, and the like. The techniques described in the present disclosure may be embodied in various electronic devices such as mobile phones, laptops, smartphones or other devices that are capable of performing digital data processing and/or video display.

Figure 4:
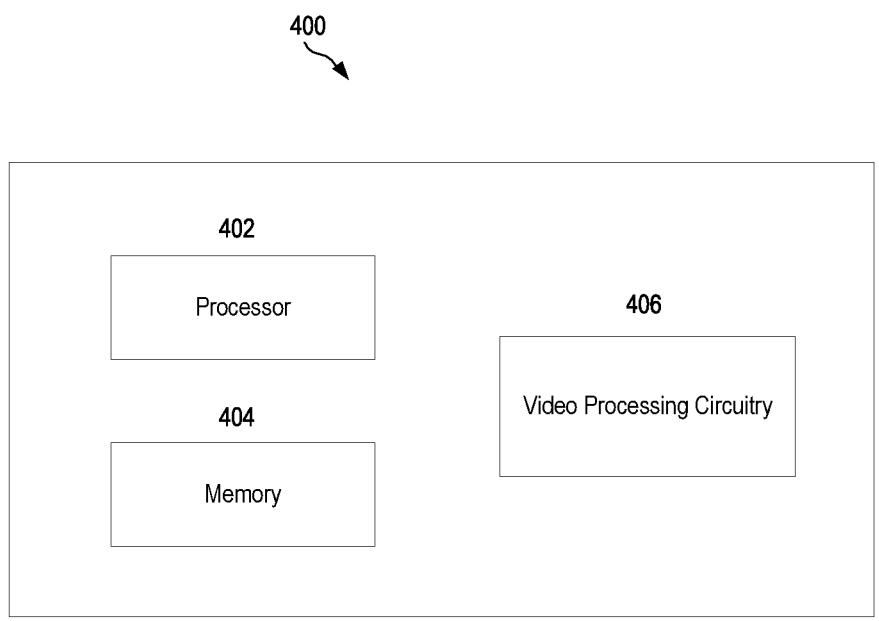
FIG. 4 is a block diagram of a video processing apparatus in accordance with some embodiments of the present disclosure.

FIG. 4 is a block diagram of a video processing apparatus 400. The apparatus 400 may be used to implement one or more of the methods described herein. The apparatus 400 may be embodied in a smartphone, tablet, computer, Internet of Things (IoT) receiver, and so on. The apparatus 400 may include one or more processors 402, one or more memories 404 and video processing hardware 406. The processor(s) 402 may be configured to implement one or more methods described in the present disclosure. The memory (memories) 404 may be used for storing data and code used for implementing the methods and techniques described herein. The video processing hardware 406 may be used to implement, in hardware circuitry, some techniques described in the present disclosure. In some embodiments, the video processing hardware 406 may be at least partly included in the processor 402, e.g., a graphics co-processor.

Figure 5:
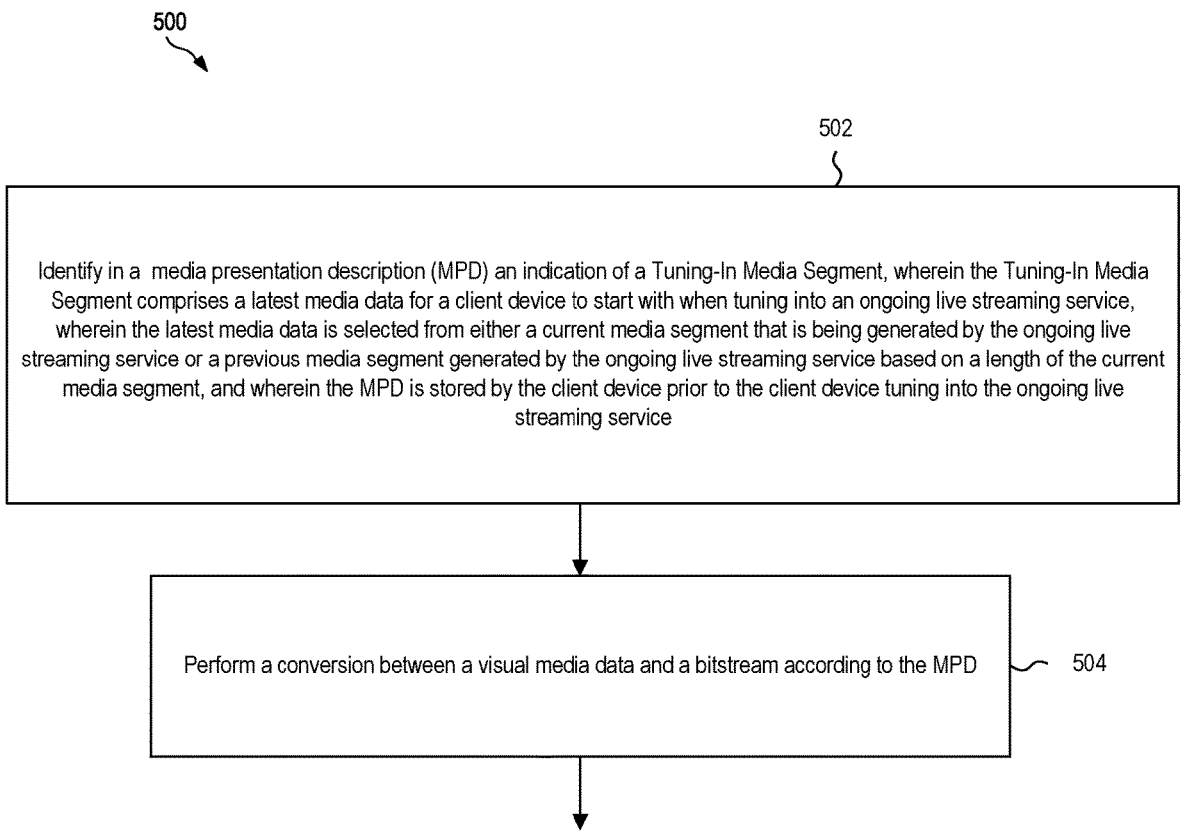
FIG. 5 is a flowchart of an example method of video processing in accordance with some embodiments of the present disclosure.

FIG. 5 is a flowchart illustrating a method for processing media data. The method may be performed by a video processing apparatus such as, but not limited to, the video processing apparatus 400 of FIG. 4. In the depicted embodiment, the method includes, at step 502, identifying in a media presentation description (MPD) an indication of a Tuning-In Media Segment. The Tuning-In Media Segment comprises a latest media data for a client device to start with when tuning into an ongoing live streaming service. The latest media data is selected from either a current media segment that is being generated by the ongoing live streaming service or a previous media segment generated by the ongoing live streaming service based on a length of the current media segment. The MPD is stored by the client device (e.g., prefetched) prior to the client device tuning into the ongoing live streaming service. The method includes, at step 504, performing a conversion between a visual media data and a bitstream according to the MPD. For example, depending on the video processing apparatus, the visual media data may be converted to a bitstream according to the MPD, or a bitstream may be converted to visual media data according to the MPD.

Figure 6:
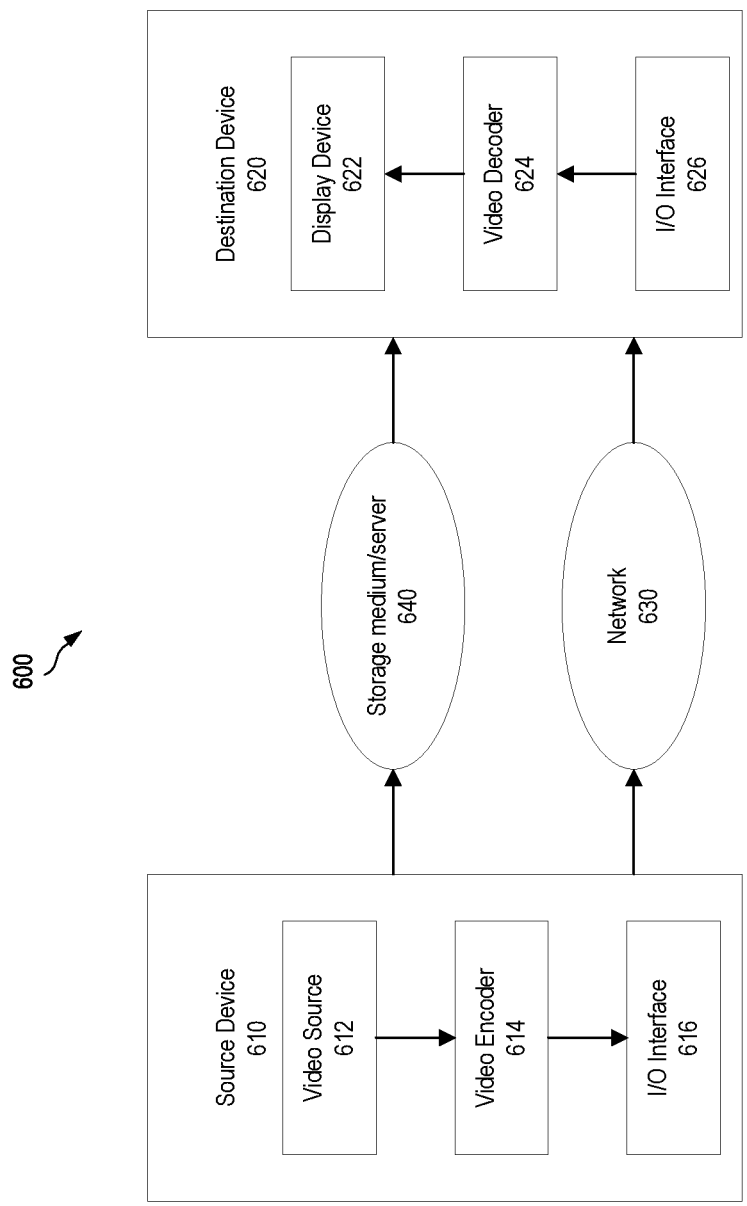
FIG. 6 is a block diagram that illustrates a video coding system in accordance with some embodiments of the present disclosure.

FIG. 6 is a block diagram that illustrates an example video coding system 600 that may utilize the techniques of this disclosure. As shown in FIG. 6, the video coding system 600 may include a source device 610 and a destination device 620. Source device 610 generates encoded video data which may be referred to as a video encoding device. Destination device 620 may decode the encoded video data generated by source device 610 which may be referred to as a video decoding device.

Source device 610 may include a video source 612, a video encoder 614, and an input/output (I/O) interface 616.

Video source 612 may include a source such as a video capture device, an interface to receive video data from a video content provider, and/or a computer graphics system for generating video data, or a combination of such sources. The video data may comprise one or more pictures. Video encoder 614 encodes the video data from video source 612 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 616 may include a modulator/demodulator (modem) and/or a transmitter. The encoded video data may be transmitted directly to destination device 620 via I/O interface 616 through network 630. The encoded video data may also be stored onto a storage medium/server 640 for access by destination device 620.

Destination device 620 may include an I/O interface 626, a video decoder 624, and a display device 622.

I/O interface 626 may include a receiver and/or a modem. I/O interface 626 may acquire encoded video data from the source device 610 or the storage medium/server 640. Video decoder 624 may decode the encoded video data. Display device 622 may display the decoded video data to a user. Display device 622 may be integrated with the destination device 620, or may be external to destination device 620 which may be configured to interface with an external display device.

Video encoder 614 and video decoder 624 may operate according to a video compression standard, such as the High Efficiency Video Coding (HEVC) standard, Versatile Video Coding (VVC) standard, and other current and/or further standards.

Figure 7:
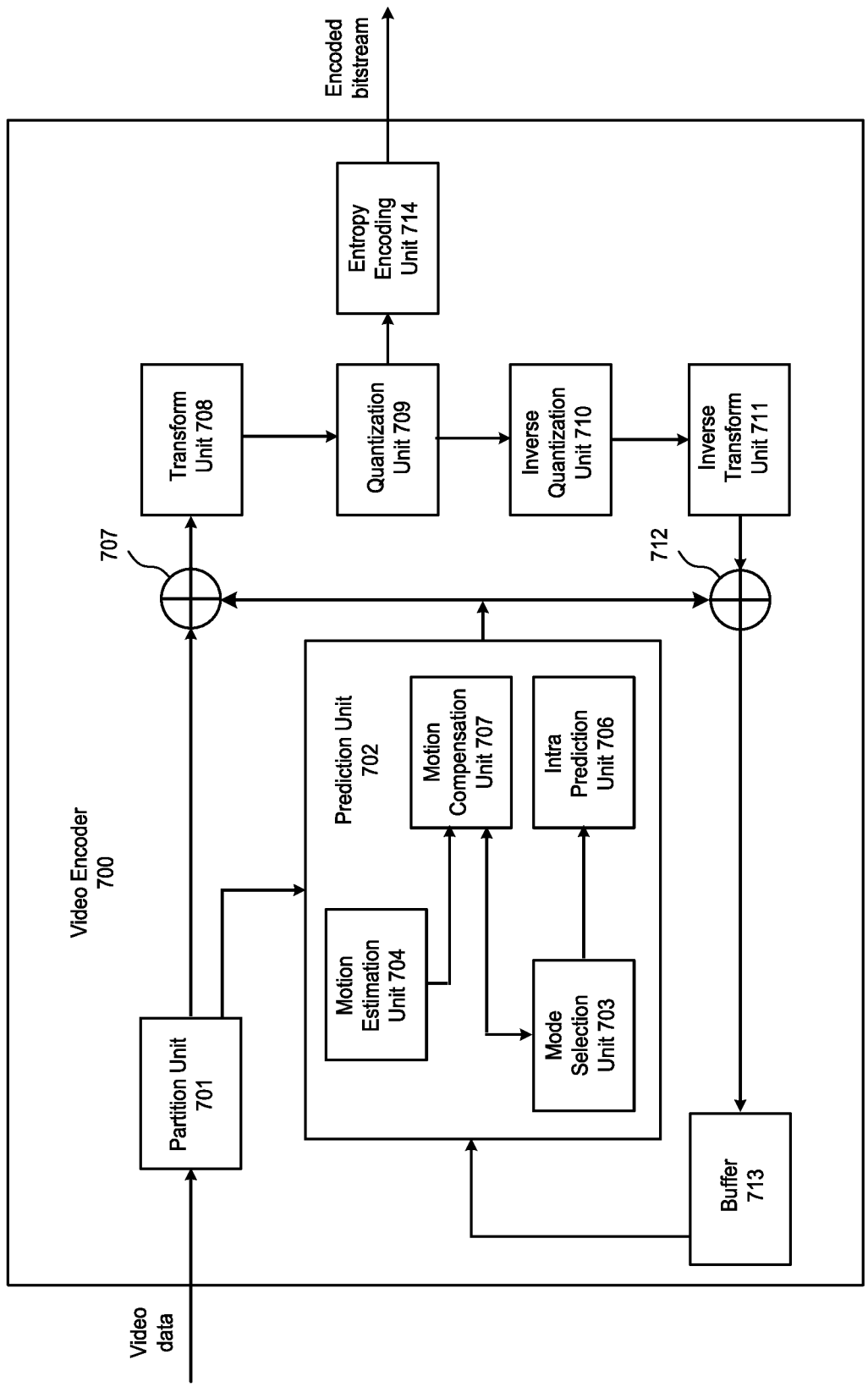
FIG. 7 is a block diagram that illustrates an encoder in accordance with some embodiments of the present disclosure.

FIG. 7 is a block diagram illustrating an example of video encoder 700, which may be video encoder 414 in the video coding system 600 illustrated in FIG. 6.

Video encoder 700 may be configured to perform any or all of the techniques of this disclosure. In the example of FIG. 7, video encoder 700 includes a plurality of functional components. The techniques described in this disclosure may be shared among the various components of video encoder 700. In some examples, a processor may be configured to perform any or all of the techniques described in this disclosure.

The functional components of video encoder 700 may include a partition unit 701, a prediction unit 702 which may include a mode select unit 703, a motion estimation unit 704, a motion compensation unit 705 and an intra prediction unit 706, a residual generation unit 707, a transform unit 708, a quantization unit 709, an inverse quantization unit 710, an inverse transform unit 711, a reconstruction unit 712, a buffer 713, and an entropy encoding unit 714.

In other examples, video encoder 700 may include more, fewer, or different functional components. In an example, prediction unit 702 may include an intra block copy (IBC) unit. The IBC unit may perform prediction in an IBC mode in which at least one reference picture is a picture where the current video block is located.

Furthermore, some components, such as motion estimation unit 704 and motion compensation unit 705 may be highly integrated, but are represented in the example of FIG. 7 separately for purposes of explanation.

Partition unit 701 may partition a picture into one or more video blocks. Video encoder 614 and video decoder 624 of FIG. 6 may support various video block sizes.

Mode select unit 703 may select one of the coding modes, intra or inter, e.g., based on error results, and provide the resulting intra- or inter-coded block to a residual generation unit 707 to generate residual block data and to a reconstruction unit 712 to reconstruct the encoded block for use as a reference picture. In some examples, mode select unit 703 may select a combination of intra and inter prediction (CIIP) mode in which the prediction is based on an inter prediction signal and an intra prediction signal. Mode select unit 703 may also select a resolution for a motion vector (e.g., a sub-pixel or integer pixel precision) for the block in the case of inter-prediction.

To perform inter prediction on a current video block, motion estimation unit 704 may generate motion information for the current video block by comparing one or more reference frames from buffer 713 to the current video block. Motion compensation unit 705 may determine a predicted video block for the current video block based on the motion information and decoded samples of pictures from buffer 713 other than the picture associated with the current video block.

Motion estimation unit 704 and motion compensation unit 705 may perform different operations for a current video block, for example, depending on whether the current video block is in an I slice, a P slice, or a B slice. I-slices (or I-frames) are the least compressible but don't require other video frames to decode. S-slices (or P-frames) can use data from previous frames to decompress and are more compressible than I-frames. B-slices (or B-frames) can use both previous and forward frames for data reference to get the highest amount of data compression.

In some examples, motion estimation unit 704 may perform uni-directional prediction for the current video block, and motion estimation unit 704 may search reference pictures of list 0 or list 1 for a reference video block for the current video block. Motion estimation unit 704 may then generate a reference index that indicates the reference picture in list 0 or list 1 that contains the reference video block and a motion vector that indicates a spatial displacement between the current video block and the reference video block. Motion estimation unit 704 may output the reference index, a prediction direction indicator, and the motion vector as the motion information of the current video block. Motion compensation unit 705 may generate the predicted video block of the current block based on the reference video block indicated by the motion information of the current video block.

In other examples, motion estimation unit 704 may perform bi-directional prediction for the current video block, motion estimation unit 704 may search the reference pictures in list 0 for a reference video block for the current video block and may also search the reference pictures in list 1 for another reference video block for the current video block. Motion estimation unit 704 may then generate reference indexes that indicate the reference pictures in list 0 and list 1 containing the reference video blocks and motion vectors that indicate spatial displacements between the reference video blocks and the current video block. Motion estimation unit 704 may output the reference indexes and the motion vectors of the current video block as the motion information of the current video block. Motion compensation unit 705 may generate the predicted video block of the current video block based on the reference video blocks indicated by the motion information of the current video block.

In some examples, motion estimation unit 704 may output a full set of motion information for decoding processing of a decoder.

In some examples, motion estimation unit 704 may not output a full set of motion information for the current video. Rather, motion estimation unit 704 may signal the motion information of the current video block with reference to the motion information of another video block. For example, motion estimation unit 704 may determine that the motion information of the current video block is sufficiently similar to the motion information of a neighboring video block.

In one example, motion estimation unit 704 may indicate, in a syntax structure associated with the current video block, a value that indicates to the video decoder 1624 that the current video block has the same motion information as another video block.

In another example, motion estimation unit 704 may identify, in a syntax structure associated with the current video block, another video block and a motion vector difference (MVD). The motion vector difference indicates a difference between the motion vector of the current video block and the motion vector of the indicated video block. The video decoder 1624 may use the motion vector of the indicated video block and the motion vector difference to determine the motion vector of the current video block.

As discussed above, video encoder 1614 may predictively signal the motion vector. Two examples of predictive signaling techniques that may be implemented by video encoder 1614 include advanced motion vector prediction (AMVP) and merge mode signaling.

Intra prediction unit 706 may perform intra prediction on the current video block. When intra prediction unit 706 performs intra prediction on the current video block, intra prediction unit 706 may generate prediction data for the current video block based on decoded samples of other video blocks in the same picture. The prediction data for the current video block may include a predicted video block and various syntax elements.

Residual generation unit 707 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block, for example in a skip mode, and residual generation unit 707 may not perform the subtracting operation.

Transform unit 708 may generate one or more transform coefficient video blocks for the current video block by applying one or more transforms to a residual video block associated with the current video block.

After transform unit 708 generates a transform coefficient video block associated with the current video block, quantization unit 709 may quantize the transform coefficient video block associated with the current video block based on one or more quantization parameter (QP) values associated with the current video block.

Inverse quantization unit 710 and inverse transform unit 711 may apply inverse quantization and inverse transforms to the transform coefficient video block, respectively, to reconstruct a residual video block from the transform coefficient video block. Reconstruction unit 712 may add the reconstructed residual video block to corresponding samples from one or more predicted video blocks generated by the prediction unit 702 to produce a reconstructed video block associated with the current block for storage in the buffer 713.

After reconstruction unit 712 reconstructs the video block, loop filtering operation may be performed to reduce video blocking artifacts in the video block.

Entropy encoding unit 714 may receive data from other functional components of the video encoder 700. When entropy encoding unit 714 receives the data, entropy encoding unit 714 may perform one or more entropy encoding operations to generate entropy encoded data and output a bitstream that includes the entropy encoded data.

Figure 8:
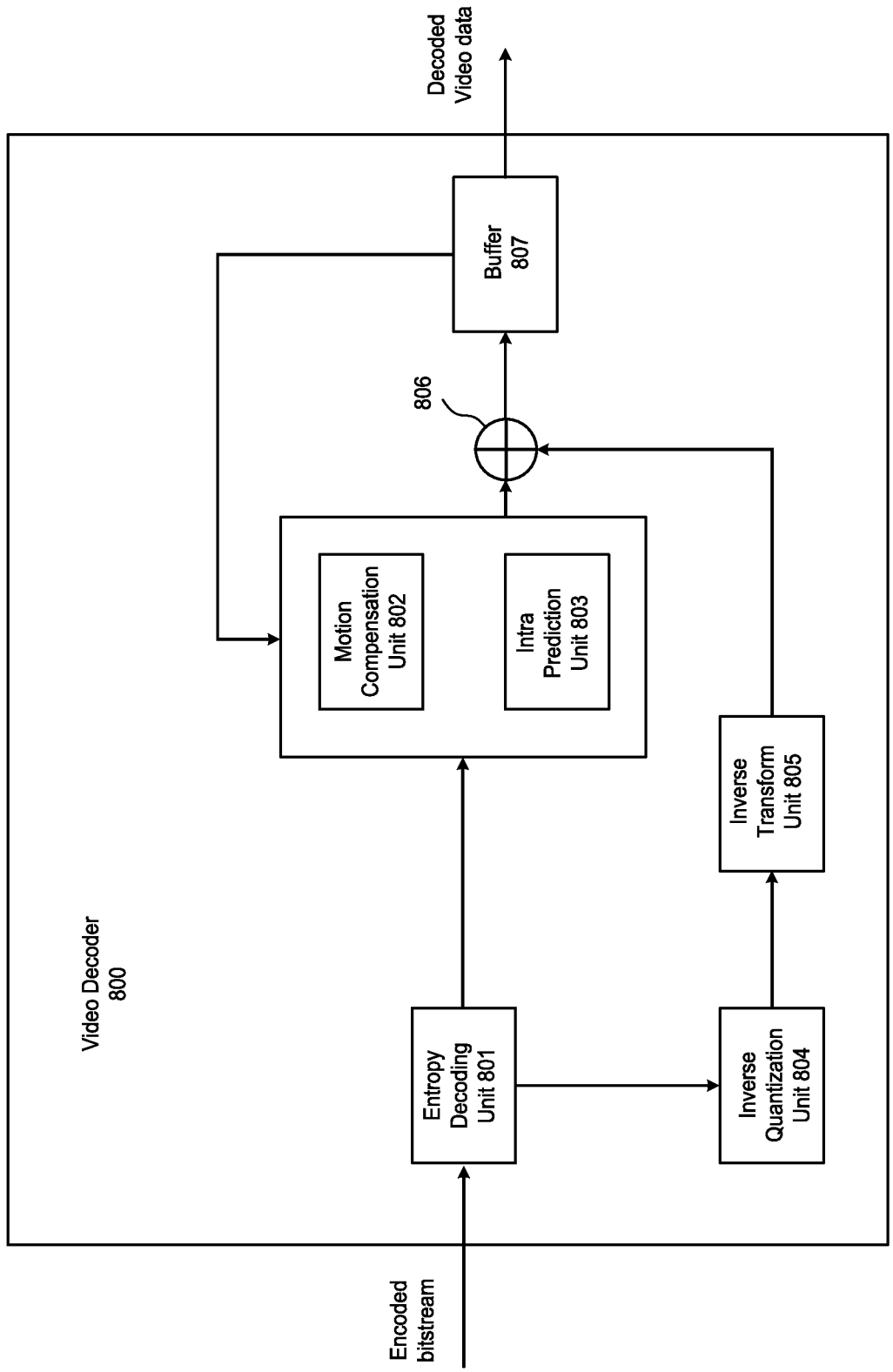
FIG. 8 is a block diagram that illustrates a decoder in accordance with some embodiments of the present disclosure.

FIG. 8 is a block diagram illustrating an example of video decoder 800, which may be video decoder 424 in the video coding system 600 illustrated in FIG. 6.

The video decoder 800 may be configured to perform any or all of the techniques of this disclosure. In the example of FIG. 8, the video decoder 800 includes a plurality of functional components. The techniques described in this disclosure may be shared among the various components of the video decoder 800. In some examples, a processor may be configured to perform any or all of the techniques described in this disclosure.

In the example of FIG. 8, video decoder 800 includes an entropy decoding unit 801, a motion compensation unit 802, an intra prediction unit 803, an inverse quantization unit 804, an inverse transformation unit 805, and a reconstruction unit 806 and a buffer 807. Video decoder 800 may, in some examples, perform a decoding pass generally reciprocal to the encoding pass described with respect to video encoder 614 (FIG. 6).

Entropy decoding unit 801 may retrieve an encoded bitstream. The encoded bitstream may include entropy coded video data (e.g., encoded blocks of video data). Entropy decoding unit 801 may decode the entropy coded video data, and from the entropy decoded video data, motion compensation unit 802 may determine motion information including motion vectors, motion vector precision, reference picture list indexes, and other motion information. Motion compensation unit 802 may, for example, determine such information by performing the AMVP and merge mode signaling.

Motion compensation unit 802 may produce motion compensated blocks, possibly performing interpolation based on interpolation filters. Identifiers for interpolation filters to be used with sub-pixel precision may be included in the syntax elements.

Motion compensation unit 802 may use interpolation filters as used by video encoder 1814 during encoding of the video block to calculate interpolated values for sub-integer pixels of a reference block. Motion compensation unit 802 may determine the interpolation filters used by video encoder 1814 according to received syntax information and use the interpolation filters to produce predictive blocks.

Motion compensation unit 802 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 803 may use intra prediction modes for example received in the bitstream to form a prediction block from spatially adjacent blocks. Inverse quantization unit 804 inverse quantizes, i.e., de-quantizes, the quantized video block coefficients provided in the bitstream and decoded by entropy decoding unit 801. Inverse transform unit 805 applies an inverse transform.

Reconstruction unit 806 may sum the residual blocks with the corresponding prediction blocks generated by motion compensation unit 802 or intra-prediction unit 803 to form decoded blocks. If desired, a deblocking filter may also be applied to filter the decoded blocks in order to remove blockiness artifacts. The decoded video blocks are then stored in buffer 807, which provides reference blocks for subsequent motion compensation/intra prediction and also produces decoded video for presentation on a display device.

Figure 9:
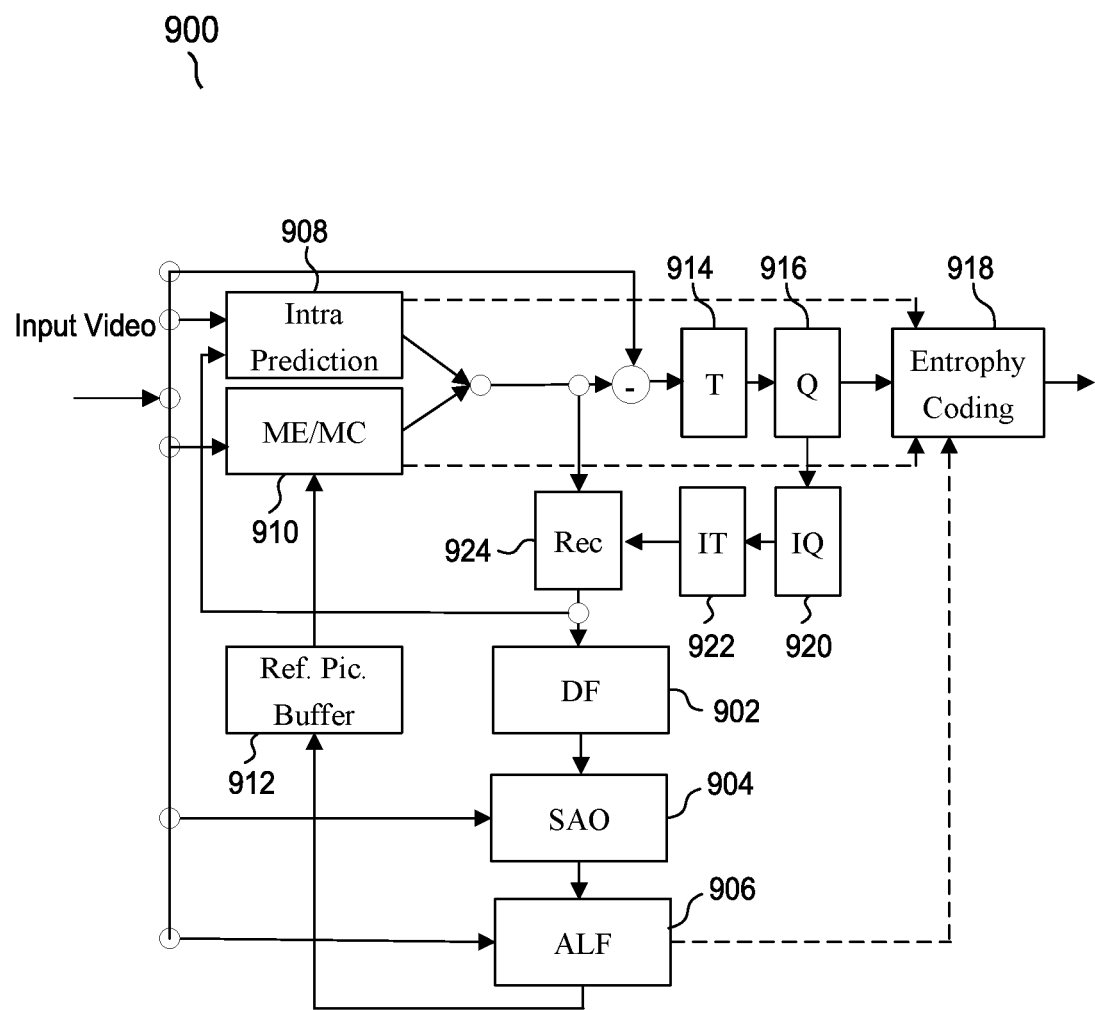
FIG. 9 shows an example of encoder block diagram.

FIG. 9 is a schematic diagram of an encoder 900. The encoder 900 is suitable for implementing the techniques of VVC. The encoder 900 includes three in-loop filters, namely a deblocking filter (DF) 902, a sample adaptive offset (SAO) 904, and an ALF 906. Unlike the DF 902, which uses predefined filters, the SAO 904 and the ALF 906 utilize the original samples of the current picture to reduce the mean square errors between the original samples and the reconstructed samples by adding an offset and by applying a FIR filter, respectively, with coded side information signaling the offsets and filter coefficients. The ALF 906 is located at the last processing stage of each picture and can be regarded as a tool trying to catch and fix artifacts created by the previous stages.

The encoder 900 further includes an intra prediction component 908 and a motion estimation/compensation (ME/MC) component 910 configured to receive input video. The intra prediction component 908 is configured to perform intra prediction, while the ME/MC component 910 is configured to utilize reference pictures obtained from a reference picture buffer 912 to perform inter prediction. Residual blocks from inter prediction or intra prediction are fed into a transform component 914 and a quantization component 916 to generate quantized residual transform coefficients, which are fed into an entropy coding component 918. The entropy coding component 918 entropy codes the prediction results and the quantized transform coefficients and transmits the same toward a video decoder (not shown). Quantization components output from the quantization component 916 may be fed into an inverse quantization component 920, an inverse transform component 922, and a reconstruction (REC) component 924. The REC component 924 is able to output images to the DF 902, the SAO 904, and the ALF 906 for filtering prior to those images being stored in the reference picture buffer 912.

The input of the DF 902 is the reconstructed samples before in-loop filters. The vertical edges in a picture are filtered first. Then the horizontal edges in a picture are filtered with samples modified by the vertical edge filtering process as input. The vertical and horizontal edges in the CTBs of each CTU are processed separately on a coding unit basis. The vertical edges of the coding blocks in a coding unit are filtered starting with the edge on the left-hand side of the coding blocks proceeding through the edges towards the right-hand side of the coding blocks in their geometrical order. The horizontal edges of the coding blocks in a coding unit are filtered starting with the edge on the top of the coding blocks proceeding through the edges towards the bottom of the coding blocks in their geometrical order.

A listing of solutions preferred by some embodiments is provided next.

The following solutions show example embodiments of techniques discussed in the previous section (e.g., items 1-2).

1. A method of media data processing comprising: performing a conversion between a visual information and a digital representation of the visual information, wherein the digital representation is formatted according to a format rule, wherein the format rule specifies to include a concatenated media segment comprising a first portion concatenated with a second portion; wherein the first portion comprises an initialization segment; and wherein the second portion comprises one or more media segments with a simple media segment of the one or more media segments having a stream type that is a closed group of picture type or an open group of pictures.
2. The method of solution 1, wherein the simple media segment comprises a first access unit of a first move segment in each track as having the stream type that is the closed group of picture type of the open group of picture type.
3. The method of solution 1, wherein the simple media segment has a type different from that of the initialization segment.
4. The method of solution 1, wherein the simple media segment is a delivery unit media segment.
5. The method of solution 1, wherein the simple media segment is an indexed media segment.
6. The method of solution 1, wherein the simple media segment is a random access media segment.
7. The method of solution 1, wherein the format rule specifies that a syntax element is included in the digital representation indicative of a location of the concatenated media segment.
8. The method of any of solutions 1-7, wherein, at a decoder, the concatenated media segment is used for turning into the visual information.
9. The method of any of solutions 1-8, wherein the conversion comprises generating the digital representation of the visual information and storing or streaming the digital representation.
10. The method of any of solutions 1-8, wherein the conversion comprises parsing generating the visual information from the digital representation.
11. A video decoding apparatus comprising a processor configured to implement a method recited in one or more of solutions 1 to 10.
12. A video encoding apparatus comprising a processor configured to implement a method recited in one or more of solutions 1 to 10.
13. A computer program product having computer code stored thereon, the code, when executed by a processor, causes the processor to implement a method recited in any of solutions 1 to 10.
14. A computer readable medium on which a bitstream representation complying to the digital representation that is generated according to any of solutions 1 to 10.
15. A method, apparatus or system described in the present disclosure.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of particular techniques. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A method for processing media data, comprising:
identifying in a media presentation description (MPD) an indication of a Tuning-In Media Segment; and performing a conversion between a visual media data and a bitstream according to the MPD,
wherein the Tuning-In Media Segment comprises an initialization segment concatenated with a single media segment,
wherein the Tuning-In Media Segment comprises latest media data for a client device to start with when tuning into an ongoing live streaming service,
wherein the latest media data is selected from either a current media segment that is being generated by the ongoing live streaming service or a previous media segment generated by the ongoing live streaming service based on a length of the current media segment, and
wherein the MPD is stored by the client device prior to the client device tuning into the ongoing live streaming service.

2. The method according to claim 1, wherein the single media segment is one of: a Simple Media Segment, a Delivery Unit Media Segment, an Indexed Unit Media Segment or a Random Access Media Segment.

3. The method according to claim 1, wherein the single media segment comprises a first access unit of a first movie fragment in each track of the single media segment corresponding to an Index of the first access unit (Isau) of a Stream Access Point (SAP) of type 1, 2, or 3.

4. The method according to claim 3, wherein the type indicates that the single media segment comprises a closed group of pictures (GOP), or wherein the type indicates that the single media segment comprises an open group of pictures (GOP), or wherein the type indicates that the single media segment excludes a particular type of segment, and wherein the particular type of segment is a gradual decoding refresh segment.

5. The method according to claim 1, wherein the MPD comprises a syntax element for specifying of a location of the Tuning-In Media Segment.

6. The method according to claim 5, wherein the syntax element is an optional element to a Segmentbase element.

7. The method according to claim 5, wherein the syntax element is an optional attribute to a SegmentTemplate element.

8. The method according to claim 1, wherein the MPD comprises encoding of one or more representations, wherein a representation comprises at most one of the Tuning-In Media Segment, and
wherein the MPD comprises a SegmentTimeline element and a SegmentTemplate.media attribute that includes a $Number$ identifier when a representation comprises the Tuning-In Media Segment.

9. The method according to claim 8, wherein a presence of the Tuning-In Media Segment is indicated in the MPD by the presence of a SegmentBase.TuningIn element, a SegmentList.TuningIn element, a SegmentTemplate.TuningIn element, or a SegmentTemplate.TuningIn attribute,
wherein the SegmentBase.TuningIn element specifies a location and a byte range for the Tuning-In Media Segment, and
wherein the SegmentTemplate.TuningIn attribute specifies a template to create the Tuning-In Media Segment, and wherein neither a $Number$ identifier nor a $Time$ identifier shall be included.

10. The method according to claim 1, further comprising identifying a live streaming tuning-in event that signals a segment number and an earliest presentation time of the Tuning-In Media Segment, and
wherein the segment number and the earliest presentation time of the Tuning-In Media Segment are signaled by using an emsg box.

11. The method of claim 1, wherein the conversion comprises encoding the visual media data into the bitstream.

12. The method of claim 1, wherein the conversion comprises decoding the visual media data from the bitstream.

13. An apparatus for processing media data comprising a processor and a non-transitory memory with instructions thereon, wherein the instructions, upon execution by the processor, cause the processor to:
identify in a media presentation description (MPD) an indication of a Tuning-In Media Segment; and
perform a conversion between a visual media data and a bitstream according to the MPD, wherein the Tuning-In Media Segment comprises an initialization segment concatenated with a single media segment,
wherein the Tuning-In Media Segment comprises latest media data for a client device to start with when tuning into an ongoing live streaming service,
wherein the latest media data is selected from either a current media segment that is being generated by the ongoing live streaming service or a previous media segment generated by the ongoing live streaming service based on a length of the current media segment, and
wherein the MPD is stored by the client device prior to the client device tuning into the ongoing live streaming service.

14. The apparatus of claim 13, wherein the single media segment is one of: a Simple Media Segment, a Delivery Unit Media Segment, an Indexed Unit Media Segment, or a Random Access Media Segment,
wherein the single media segment comprises a first access unit of a first movie fragment in each track of the single media segment corresponding to an Index of the first access unit (Isau) of a Stream Access Point (SAP) of type 1, 2, or 3,
wherein the type indicates that the single media segment comprises a closed group of pictures (GOP), or wherein the type indicates that the single media segment comprises an open group of pictures (GOP), or wherein the type indicates that the single media segment excludes a particular type of segment, and wherein the particular type of segment is a gradual decoding refresh segment,
wherein the MPD comprises a syntax element for specifying of a location of the Tuning-In Media Segment,
wherein the syntax element is an optional element to a Segmentbase element, or wherein the syntax element is an optional attribute to a SegmentTemplate element,
wherein the MPD comprises encoding of one or more representations, wherein a representation comprises at most one of the Tuning-In Media Segment, and wherein the MPD comprises a SegmentTimeline element and a SegmentTemplate.media attribute that includes a $Number$ identifier when a representation comprises the Tuning-In Media Segment,
wherein a presence of the Tuning-In Media Segment is indicated in the MPD by the presence of a SegmentBase.TuningIn element, a SegmentList.TuningIn element, a SegmentTemplate.TuningIn element, or a SegmentTemplate.TuningIn attribute, wherein the SegmentBase.TuningIn element specifies a location and a byte range for the Tuning-In Media Segment, and wherein the SegmentTemplate.TuningIn attribute specifies a template to create the Tuning-In Media Segment, and wherein neither a $Number$ identifier nor a $Time$ identifier shall be included,
wherein the instructions further cause the processor to identify a live streaming tuning-in event that signals a segment number and an earliest presentation time of the Tuning-In Media Segment, and wherein the segment number and the earliest presentation time of the Tuning-In Media Segment are signaled by using an emsg box.

15. A non-transitory computer-readable storage medium storing instructions that cause a processor to:
identify in a media presentation description (MPD) an indication of a Tuning-In Media Segment; and
perform a conversion between a visual media data and a bitstream according to the MPD,
wherein the Tuning-In Media Segment comprises an initialization segment concatenated with a single media segment,
wherein the Tuning-In Media Segment comprises latest media data for a client device to start with when tuning into an ongoing live streaming service,
wherein the latest media data is selected from either a current media segment that is being generated by the ongoing live streaming service or a previous media segment generated by the ongoing live streaming service based on a length of the current media segment, and
wherein the MPD is stored by the client device prior to the client device tuning into the ongoing live streaming service.

16. The non-transitory computer-readable storage medium of claim 15,
- wherein the single media segment is one of: a Simple Media Segment, a Delivery Unit Media Segment, an Indexed Unit Media Segment or a Random Access Media Segment,
- wherein the single media segment comprises a first access unit of a first movie fragment in each track of the single media segment corresponding to an Index of the first access unit (Isau) of a Stream Access Point (SAP) of type 1, 2, or 3,
- wherein the type indicates that the single media segment comprises a closed group of pictures (GOP), or wherein the type indicates that the single media segment comprises an open group of pictures (GOP), or wherein the type indicates that the single media segment excludes a particular type of segment, and wherein the particular type of segment is a gradual decoding refresh segment, wherein the MPD comprises a syntax element for specifying of a location of the Tuning-In Media Segment,
- wherein the syntax element is an optional element to a Segmentbase element, or wherein the syntax element is an optional attribute to a SegmentTemplate element,
- wherein the MPD comprises encoding of one or more representations, wherein a representation comprises at most one of the Tuning-In Media Segment, and wherein the MPD comprises a SegmentTimeline element and a SegmentTemplate.media attribute that includes a $Number$ identifier when a representation comprises the Tuning-In Media Segment,
- wherein a presence of the Tuning-In Media Segment is indicated in the MPD by the presence of a SegmentBase.TuningIn element, a SegmentList.TuningIn element, a SegmentTemplate.TuningIn element, or a SegmentTemplate.TuningIn attribute, wherein the SegmentBase.TuningIn element specifies a location and a byte range for the Tuning-In Media Segment, and wherein the SegmentTemplate.TuningIn attribute specifies a template to create the Tuning-In Media Segment, and wherein neither a $Number$ identifier nor a $Time$ identifier shall be included, and
- wherein the instructions further cause the processor to identify a live streaming tuning-in event that signals a segment number and an earliest presentation time of the Tuning-In Media Segment, and wherein the segment number and the earliest presentation time of the Tuning-In Media Segment are signaled by using an emsg box.

17. A non-transitory computer-readable recording medium storing a bitstream of a video which is generated by a method performed by a video processing apparatus, wherein the method comprises:
- identifying in an MPD an indication of a Tuning-In Media Segment; and
- generating the bitstream based on the MPD, wherein the Tuning-In Media Segment comprises an initialization segment concatenated with a single media segment,
- wherein the Tuning-In Media Segment comprises latest media data for a client device to start with when tuning into an ongoing live streaming service,
- wherein the latest media data is selected from either a current media segment that is being generated by the ongoing live streaming service or a previous media segment generated by the ongoing live streaming service based on a length of the current media segment, and
- wherein the MPD is stored by the client device prior to the client device tuning into the ongoing live streaming service.

* * * * *